(12) United States Patent
Dunsmore et al.

(10) Patent No.: US 8,046,445 B2
(45) Date of Patent: Oct. 25, 2011

(54) METHODS AND SYSTEMS FOR MANAGING NETWORK ELEMENTS

(75) Inventors: Richard James Dunsmore, McKinney, TX (US); Man Wing Fong, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 12/496,336

(22) Filed: Jul. 1, 2009

(65) Prior Publication Data

US 2011/0004661 A1 Jan. 6, 2011

(51) Int. Cl.
*G06F 15/16* (2006.01)
(52) U.S. Cl. .................................................. 709/222
(58) Field of Classification Search ................... 709/222
See application file for complete search history.

(56) References Cited

U.S. PATENT DOCUMENTS

| | | | |
|---|---|---|---|
| 5,925,137 A * | 7/1999 | Okanoue et al. ................ 714/4 |
| 6,615,273 B1 * | 9/2003 | Pan ............................. 709/242 |
| 6,731,632 B1 * | 5/2004 | Takahashi et al. ............ 370/392 |
| 6,738,828 B1 * | 5/2004 | Keats et al. ................... 709/245 |
| 6,822,955 B1 | 11/2004 | Brothers et al. .............. 370/389 |
| 6,888,798 B2 | 5/2005 | Jamieson et al. ............. 370/236 |
| 6,999,409 B2 * | 2/2006 | Oyamada ....................... 370/218 |
| 7,433,362 B2 * | 10/2008 | Mallya et al. ................ 370/408 |
| 7,512,136 B2 | 3/2009 | Korotin ......................... 370/401 |
| 7,551,635 B2 * | 6/2009 | Mallya et al. ................ 370/408 |
| 2005/0036480 A1 * | 2/2005 | Glaser et al. ................. 370/351 |
| 2005/0047350 A1 * | 3/2005 | Kantor et al. ................ 370/254 |

OTHER PUBLICATIONS

Bertrand Vandermaesen, "Migration to an IP Management of SONET/SDH," in Optical Fiber Communication Conference and Exposition and The National Fiber Optic Engineers Conference, Mar. 6, 2005, Technical Digest (CD) (Optical Society of America, 2005), paper NThE4.*

* cited by examiner

*Primary Examiner* — Ajay Bhatia
(74) *Attorney, Agent, or Firm* — Baker Botts L.L.P.

(57) ABSTRACT

A system for managing networks includes a gateway capable of receiving a first TARP request from a requesting node and generating a second TARP request based on the first TARP request. The second TARP request includes an NSAP address of the gateway. The gateway is further capable of transmitting the second TARP request to a destination node. The gateway is also capable of receiving a first TARP response from the destination node and generating a second TARP response based on the first TARP response. The second TARP response includes the NSAP address of the gateway. The gateway is further capable of transmitting the second TARP response to the requesting node.

19 Claims, 3 Drawing Sheets

METHODS AND SYSTEMS FOR MANAGING NETWORK ELEMENTS

TECHNICAL FIELD OF THE INVENTION

This invention relates generally to managing network elements and more particularly to a method and system for address resolution and mediation in a distributed network.

BACKGROUND OF THE INVENTION

As communication networks continue to grow in size and scope, they become increasingly difficult to implement and manage. Network management may become a limiting factor in the attainable size of such networks. For example, in certain networks, the OSI protocol suite and Transaction Language 1 (TL1) provide management connectivity with TL1 serving as the network management protocol. Building scalable TL1 networks involves significant complexity. Prior attempts to address these issues in TL1 and other management networks have included costly upfront planning and appropriate area address management, or restricting the aggregate size of the managed network. Current scaling solutions for such networks often require more effort than network operators are willing to deal with. Therefore, many types of networks may be effectively limited to a maximum size by management constraints.

SUMMARY OF THE INVENTION

The present invention provides a method and system for address resolution that substantially reduces or eliminates at least some of the disadvantages and problems associated with previous methods and systems for address resolution of network addresses.

In accordance with one embodiment of the present invention, a method for managing networks includes receiving at a gateway a first Target Identifier Address Resolution Protocol (TARP) request from a requesting node. The TARP request includes a Target Identifier (TID) of a destination node. The method also includes generating a second TARP request based on the first TARP request and transmitting the second TARP request from the gateway to a destination node. The second TARP request includes a Network Service Access Point (NSAP) address of the gateway. The method further includes receiving at the gateway a first TARP response from the destination node that includes an NSAP address of the destination node. Additionally, the method includes generating a second TARP response based on the first TARP response and transmitting the second TARP response to the requesting node. The second TARP response includes an NSAP address of the gateway.

In accordance with another embodiment of the present invention a system includes a gateway capable of receiving a first TARP request from a requesting node and generating a second TARP request based on the first TARP request. The second TARP request includes an NSAP address of the gateway. The gateway is further capable of transmitting the second TARP request to a destination node. The gateway is also capable of receiving a first TARP response from the destination node and generating a second TARP response based on the first TARP response. The second TARP response includes the NSAP address of the gateway. The gateway is further capable of transmitting the second TARP response to the requesting node.

Important technical advantages of certain aspects of the present invention include the ability to create virtual segments in a Level-1 OSI routing area. As a result, particular embodiments of the present invention facilitate the building of scalable and manageable OSI networks. By effectively proxying TARP address resolution, a network operator may scale an OSI network without upfront planning regarding OSI routing areas. Thus, a network operator may assign all network elements in an OSI network to a single Level-1 routing area, without the risk of routing tables becoming full as more network elements are added to the network.

Additionally, by proxying TARP requests and responses, particular embodiments of the present invention allow a network operator to easily reassign addresses within a given virtual segment of an OSI routing area without impacting other elements of the embodiments of the present invention. Moreover, by providing a TL1 mediation process between elements of different virtual segments, particular embodiments of the present invention allow for convenient management of every element of the present invention. Because certain elements of the present invention may be unaware of the presence and operation of the proxy TARP address resolution, particular embodiments may be implemented with little or no reconfiguration of existing elements. Thus, particular embodiments of the present invention are backward compatible with legacy and third party elements. Other technical advantages of the present invention will be readily apparent to one skilled in the art from the following figures, description, and claims. Moreover, while specific advantages have been enumerated above, various embodiments may include all, some, or none of the enumerated advantages.

DETAILED DESCRIPTION OF THE INVENTION

Figure 1A:
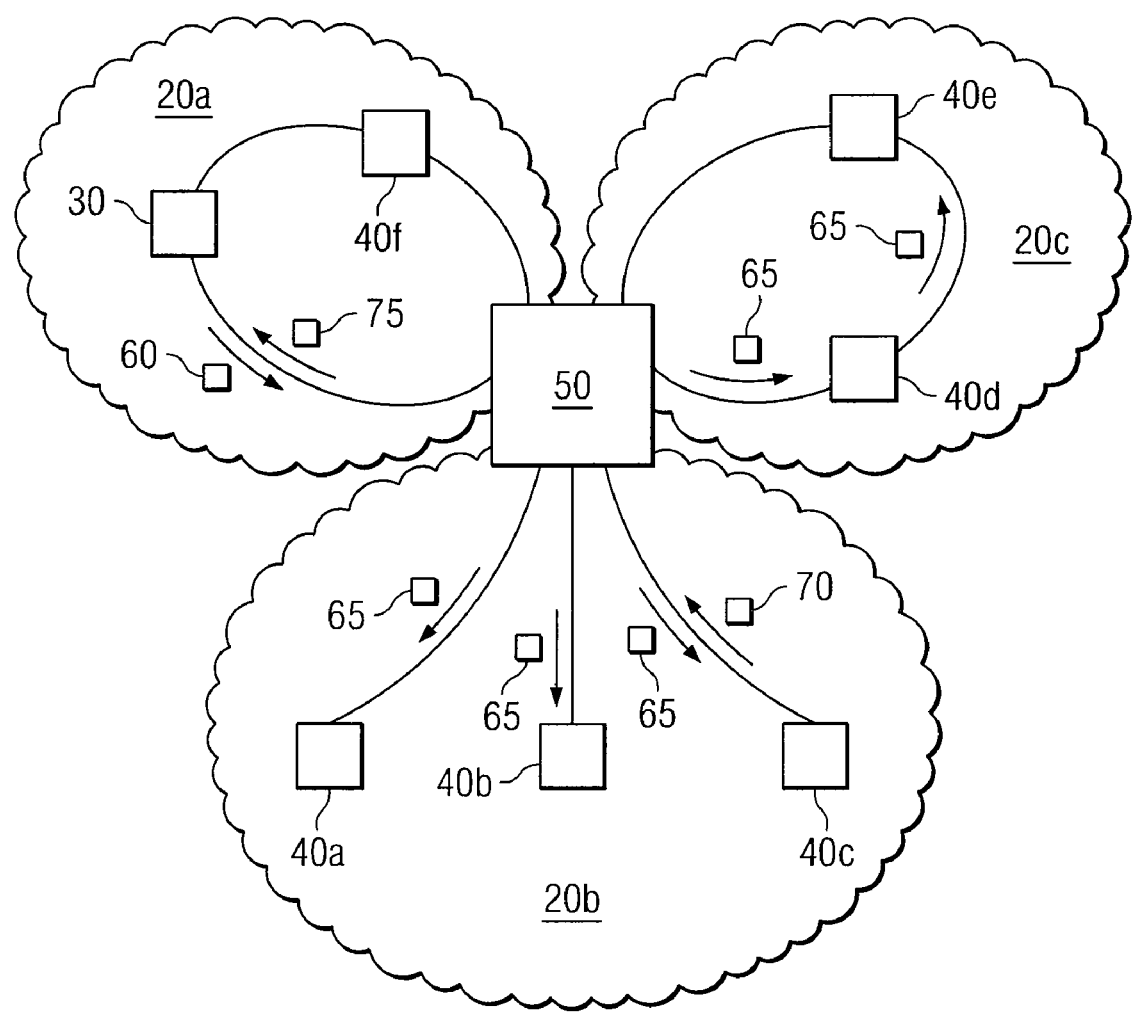
FIG. 1A is a block diagram illustrating a proxy TARP address resolution system according to particular embodiments of the present invention.

FIG. 1 illustrates a particular embodiment of a system 10 for utilizing a TARP proxy agent for TID-to-NSAP address resolution in an OSI network. System 10 includes one or more networks 20, network management station (NMS) 30, one or more network elements (NE) 40, and a Target Address Resolution Protocol Gateway (TARG) 50. To facilitate the creation of virtual segments in a Level-1 OSI routing domain, TARG 50 may serve as a TARP proxy agent for a Level-1 OSI routing area. NMS 30 requests a Network Service Access Point (NSAP) address of NE 40, and TARG may respond with its own NSAP. NMS 30 may then communicate with NE 40 through TARG 50. Network operators are thus able to virtually segment a Level-1 OSI routing area. Additionally, TARG 50 may serve as a Transaction Language 1 (TL1) mediation server for communicating TL1 messages across virtual segments of an OSI routing area.

Networks 20a, 20b, and 20c (which may be referred to each individually as a "network 20" or collectively as "networks 20") each represent any form of communication network supporting circuit-switched, packet-based, and/or any other suitable type of communication. In particular embodiments, network 20 may represent, in whole or in part, elements of a SONET/SDH network, Asynchronous Transfer Mode network, Frame Relay network, or Internet Protocol network. Although shown in FIG. 1 as representing three interconnected networks, networks 20 may each represent one or more separate networks including all or parts of various different networks that are separated and serve different TARGs 50, NEs 40 and NMSs 30. Network 20 may include routers, hubs, switches, gateways, call controllers, regenerators, optical amplifiers, add-drop multiplexers, digital cross-connects, and/or any other suitable components in any suitable form or arrangement. In general, networks 20a, 20b, and 20c may comprise any combination of public or private communication equipment such as elements of the public switched telephone network (PSTN), a global computer network such as the Internet, a local area network (LAN), a wide area network (WAN), or other appropriate communication equipment.

Network management station (NMS) 30 is connected to network 20 directly or indirectly and manages operations and configurations of one or more network elements (NE) 40 and/or network 20. NMS 30 may be any type of device suitable to manage NE 40 and/or network 20, including, but not limited to, workstations, personal computers (PCs), laptops, blade servers, server farms, and standalone servers. Although shown in FIG. 1 as comprising a single component, in particular embodiments, NMS 30 may represent functionality provided by several separate physical components. More generally, NMS 30 may represent any appropriate combination of software and/or hardware suitable to provide the described functionality.

Network elements (NEs) 40a, 40b, 40c, 40d, 40e, and 40f (which may be referred to each individually as a "network element 40" or "NE 40" or collectively as "network elements 40" or "NEs 40") are each network communication devices residing on or otherwise connected to networks 20 either directly or indirectly, and may be capable of receiving and transmitting network traffic. In particular embodiments, NE 40 may be capable of placing traffic on network 20 from another network, removing traffic from network 20 and forwarding traffic to another network, or forwarding traffic on network 20 to additional NEs 40 on network 20. NE 40 may be any type of device suitable to receive and transmit network traffic, including routers, hubs, switches, gateways, call controllers, regenerators, optical amplifiers, add-drop multiplexers, digital cross-connects, and/or any other suitable components in any suitable form or arrangement. In particular embodiments, NEs 40 may represent functionality provided by software operating on a server. Although shown in FIG. 1 as comprising a single component, in particular embodiments, NEs 40 may each represent functionality provided by several separate physical components.

Target Identifier Address Resolution Protocol Gateway (TARG) 50 is connected to one or more networks 20 and provides TL1 mediation and proxy address resolution for NMS 30 and/or one or more NEs 40. TARG 50 may be any type of device suitable to perform the described functions, including, but not limited to, workstations, laptops, blade servers, server farms, or standalone servers. Although shown in FIG. 1 as comprising a single component, in particular embodiments, TARG 50 may represent functionality provided by several separate physical components. Additionally, in particular embodiments, TARG 50 may represent software residing on one or more NEs 40, or software residing on NMS 30. Although FIG. 1 illustrates, for purposes of example, a single TARG 50, particular embodiments of system 10 may include any appropriate number of TARGs 50 arranged in any suitable configuration. In particular embodiments, multiple TARGs 50 may be utilized to virtually segment a Level-1 OSI routing area into multiple virtual routing areas. Additionally, one or more TARGs 50 may be utilized to virtually segment a hierarchical OSI network that includes Level-1 and Level-2 routing areas.

In operation, system 10 proxies TARP address resolution requests and responses, allowing network operators to create virtual segments in a Level-1 OSI routing area. In particular embodiments, NMS 30 may request an NSAP address of NE 40, and TARG 50 may proxy the TARP resolution requests by transmitting to NMS 30 an NSAP address of TARG 50. Moreover, TARG 50 may store a table of Target-Identifier-to-Network-Service-Access-Point associations, facilitating more efficient proxy TARP address resolution. Additionally, TARG 50 may provide for TL1 mediation between NMS 30 and one or more NEs 40 in a virtually-segmented OSI Level-1 routing area. By using a proxy address resolution agent to virtually segment an OSI Level-1 routing area, system 10 allows a network operator to cost-effectively build a scalable OSI network. Additionally, system 10 may allow a network operator to provide for a scalable OSI network that includes backwards compatibility with legacy and third-party systems.

An example of this process, as implemented by a particular embodiment of system 10, is illustrated in FIG. 1A. In particular embodiments of system 10, a Target Identifier (TID) may represent a user-assigned name for a particular network node or element. Each TID may be unique within a Level-1 OSI routing area. An NSAP address may represent a globally-unique user-assigned network address. In general, upper-layer services and protocols utilize a TID to address data packets for communication. Lower-layer services and protocols, however, may utilize NSAP addresses for communication. Thus, in particular embodiments, a data packet may be addressed with the TID of a destination node or element, and an NSAP address of an intermediate or destination node or element. In particular embodiments, intermediate nodes may rewrite the destination NSAP address before retransmitting the data packets.

In general, Target Identifier Address Resolution Protocol (TARP) is used in particular embodiments of system 10 to resolve an NSAP address to a given TID. Thus, an element of system 10 that seeks to communicate with a particular NE 40 having a known TID may transmit a TARP request to resolve the NSAP address of NE 40. NE 40 receives a TARP request and responds with a TARP response, which includes an NSAP address of the responding NE 40. The requesting element of system 10 receives the TARP response, and so discovers an NSAP address of the relevant NE 40.

As shown in FIG. 1A, NMS 30 initiates communication with NE 40c, which has a unique TID. In order to communicate, NMS 30 may require the NSAP address of NE 40c. Thus, NMS 30 attempts to resolve the NSAP address corresponding to the TID of NE 40c, by transmitting a TARP request 60 on network 20a. In particular embodiments, NMS 30 may transmit TARP request 60 by broadcasting TARP request 60 on network 20a. Additionally, NMS 30 may unicast or multicast TARP request 60 to TARG 50, or another node or element on network 20. In general, however, NMS 30 may transmit TARP request 60 on network 20 in any appropriate manner suitable to perform the described functionality.

TARG 50 receives TARP request 60 and generates a proxied TARP request 65 based on TARP request 60. TARG 50 may generate proxied TARP request 65 based in any suitable manner on TARP request 60. Proxied TARP request 65 may include any appropriate information from TARP request 60 and/or any other information stored or generated by TARG 50. For example, in particular embodiments, TARG 50 generates proxied TARP request 65 by overwriting an NSAP address of NMS 30 in TARP request 60 with an NSAP address of TARG 50.

TARG 50 may also store information from TARP request 60 in a TID-NSAP association table to be used to facilitate subsequent communication between NMS 30 and the destination NE 40*c*. For example, in particular embodiments, TARG 50 may create an entry for a destination node of TARP request 60 in an associated table maintained by TARG 50 and store a destination TID from TARP request 60 in the created entry.

TARG 50 may then retransmit or forward proxied TARP request 65 on one or more networks 20 attached to TARG 50. In particular embodiments, TARG 50 may transmit this proxied TARP request 65 by broadcasting proxied TARP request 65 on networks 20*b* and 20*c*. Additionally, TARG 50 may unicast or multicast proxied TARP request 65 to NE 40*c*, or another node or element on networks 20*b* or 20*c*.

NE 40*c* receives proxied TARP request 65 from TARG 50. NEs 40*a*, 40*b*, 40*d*, and 40*e* may also receive proxied TARP request 65 from TARG 50. However, because their respective TIDs do not match the TID included in proxied TARP request 65, these NEs 40 may discard proxied TARP request 65. NE 40*c*, whose TID matches that of the TID included in proxied TARP request 65, transmits a TARP response 70, which may include the NSAP address of NE 40*c*, on network 20*b*. In particular embodiments, NE 40*c* may transmit TARP response 70 by unicasting TARP request 70 to TARG 50 on network 20*b*. Additionally, NE 40*c* may broadcast or multicast TARP response 70 to TARG 50 on network 20*b*, or another node or element on network 20*b*.

TARG 50 receives TARP response 70 from NE 40*c*. In particular embodiments, TARG 50 may be capable of storing in memory the NSAP address received from NE 40. TARG 50 may store the NSAP address included in TARP response 70 in a TID-NSAP association table. In particular embodiments, a TID-NSAP association table may allow TARG 50 to maintain a table of TIDs and corresponding NSAP address. Thus, TARG 50 may respond to future TARP requests 60 for the NSAP address of NE 40*c* by referencing a TID-NSAP association table. In particular embodiments, TARG 50 may remove entries from the TID-NSAP association table after a predetermined or user-defined time. As a result, entries in the TID-NSAP association table may be "aged-out" or removed after a period of time.

Additionally, TARG 50 generates a proxied TARP response 75 based on TARP response 70. TARG 50 may generate proxied TARP response 75 based in any suitable manner on TARP response 70. Proxied TARP response 75 may include any appropriate information from TARP response 70 and/or any other information stored or generated by TARG 50. For example, in particular embodiments, TARG 50 generates proxied TARP response 75 by overwriting an NSAP address of TARG 50 in TARP response 70 (that may be included, for example, as a destination address of TARP response 70) with an NSAP address of NMS 30. In particular embodiments, TARG 50 may also overwrite an NSAP address of NE 40*c* (that may be included, for example, as a source address of TARP response 70) with an NSAP address of TARG 50. TARG 50 then transmits proxied TARP response 75 to NMS 30. As a result, proxied TARP response 75 may include the NSAP address of TARG 50. TARG 50 may then transmit proxied TARP response 75 to NMS 30 over network 20*a*. TARG 50 may transmit proxied TARP response 75 by unicasting, broadcasting, or multicasting proxied TARP response 75 to NMS 30 or another node or element on the relevant network 20. In general, TARG 50 may transmit proxied TARP response 75 in any appropriate manner.

NMS 30 receives proxied TARP response 75 from TARG 50, which may include the NSAP address of TARG 50. Thus, NMS 30 resolves the NSAP address corresponding to the TID of NE 40*c* as the NSAP address of TARG 50. Data packets communicated from NMS 30 to NE 40 may be addressed to the TID of NE 40*c* and the NSAP address of TARG 50. In particular embodiments, NMS 30 may store in memory the NSAP address included in proxied TARP response 75 in a table of TID-NSAP address associations. Thus, in this example, NMS 30 may store an association between the TID of NE 40 and the NSAP address of TARG 50. Thus, when initiating communication with NE 40*c*, NMS 30 may use the TID of NE 40*c* to retrieve from its table of TID-NSAP address associations the NSAP address of TARG 50. NMS 30 may then subsequently address data packets to NE 40*c* with the TID of NE 40*c* and the NSAP address of TARG 50. In particular embodiments, NMS 30 may remove entries from the TID-NSAP association table after a predetermined or user-defined time. After an entry is removed, subsequent communications may require NMS 30 to retransmit TARP request 60 on network 20*a* to attempt to resolve the corresponding NSAP address, as detailed above.

Figure 1B:
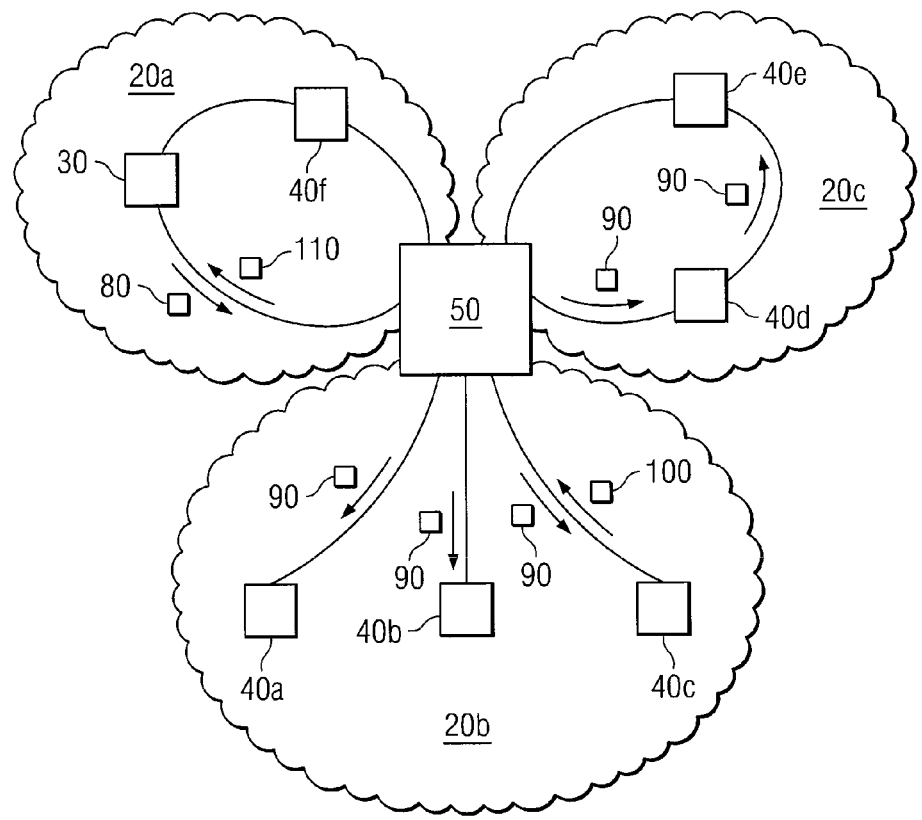
FIG. 1B is a block diagram illustrating a TL1 mediation system according to particular embodiments of the present invention.

FIG. 1B illustrates one example of an application protocol utilizing proxy TARP address resolution, with particular reference to TL1. In particular embodiments, TARG 50 may serve as a TL1 mediation gateway between NMS 30 and NE 40 in a virtually segmented OSI Level-1 routing area. TL1 is provided as an example for illustration purposes only, and embodiments of system 10 may utilize any appropriate application protocol.

NMS 30 may, in particular embodiments of system 10, use the TL1 protocol and/or TL1 syntax to manage operations and configuration of various elements within system 10, including NEs 40. To manage NEs 40, NMS 30 sends data packets including TL1 messages to the TID of a particular NE 40. Thus, NMS 30 attempts to resolve the NSAP address of the relevant NE 40. NMS 30 transmits TARP request 60 on network 20*a*, as illustrated in FIG. 1A, and the process as described above is followed. In response to TARP request 60, NMS 30 receives proxied TARP response 75 from TARG 50, which includes the NSAP address of TARG 50. Thus, NMS 30, although requesting the NSAP address of NE 40*c*, receives the NSAP address of TARG 50. NMS 30 then transmits a TL1 message 80 addressed to the TID of NE 40*c* and an NSAP address of TARG 50 to TARG 50.

TARG 50 receives TL1 message 80 from NMS 30. In response to receiving TL1 message 80, TARG 50 generates a proxied TL1 message 90 based on TL1 message 80. TARG 50 may generate proxied TL1 message 90 based in any suitable manner on TL1 message 80. Proxied TL1 message 90 may include any appropriate information from TL1 message 80 and/or any other information stored or generated by TARG 50.

For example, in particular embodiments, TARG 50 recognizes that TL1 message 80 is addressed to the TID of NE 40*c*, and may retrieve the NSAP address of NE 40*c* from the TID-NSAP association table stored in memory in order to generate proxied TL1 message 90. TARG 50 may then generate a proxied TL1 message 90 addressed to an NSAP address of NE 40*c* by rewriting the source and destination addresses of TL1 message 80. More specifically, TARG 50 may replace the source NSAP address in TL1 message 80 (i.e., the NSAP address of NMS 30 in this example) with its own NSAP address and the destination NSAP address in TL1 message 80 (i.e., its own NSAP address) with the NSAP address of NE 40c retrieved from the TID-NSAP association table.

TARG 50 then transmits proxied TL1 message 90 to NE 40c. NE 40c receives proxied TL1 message 90 from TARG 50. In particular embodiments, proxied TL1 message 90 may instruct NE 40c to perform certain operations or alter certain configurations of NE 40c or other elements of system 10. Additionally, proxied TL1 message 90 received from NMS 30 through TARG 50 may cause NE 40c to transmit a TL1 message to NMS 30 through TARG 50 in response (shown as TL1 message 100 in FIG. 1B). Because proxied TL1 message 90 was transmitted from TARG 50, NE 40c may respond by transmitting TL1 message 100 to TARG 50. Thus, TL1 message 100 may be addressed with a TID of NMS 30 but an NSAP address of TARG 50.

TARG 50 receives TL1 message 100 from NE 40c. In response to receiving TL1 message 100, TARG 50 generates a proxied TL1 message 110 based on TL1 message 100. TARG 50 may generate proxied TL1 message 110 based in any suitable manner on TL1 message 100. Proxied TL1 message 110 may include any appropriate information from TL1 message 100 and/or any other information stored or generated by TARG 50.

For example, in particular embodiments, TARG 50 recognizes that TL1 message 100 is addressed to the TID of NMS 30, and may retrieve the NSAP address of NMS 30 from the TID-NSAP association table stored in memory in order to generate proxied TL1 message 110 for transmission back to NMS 30. TARG 50 may then generate proxied TL1 message 110 addressed to an NSAP address of NMS 30 by overwriting the source and destination addresses of TL1 message 100. More specifically, TARG 50 may replace the source NSAP address in TL1 message 100 (i.e., the NSAP address of NE 40c in this example) with its own NSAP address and the destination NSAP address in TL1 message 100 (i.e., its own NSAP address) with the NSAP address of NMS 30 retrieved from the TID-NSAP association table.

TARG 50 may then transmit proxied TL1 message 110 to NMS 30. Thus, TARG 50 may "stitch together" or connect two separate connections between NMS 30 and NE 40c into a single virtual connection. NMS 30 and NE 40 may each be unaware of the presence of TARG 50 in the process. In this manner, a network operator may scale an OSI network without reconfiguration of NEs 40 and NMS 30.

The above process may be repeated any appropriate number of times between NMS 30, NE 40 and TARG 50, in accordance with the features and protocols of the communicating elements. In particular embodiments, the process as described above may also be used between other various elements of system 10, including between various NEs 40, between NMS 30 and additional NEs 40, or between NMS 30 and additional TARGs 50. In general, TARG 50 may be operable to serve as a TL1 mediation gateway between or among any appropriate number and type of elements of system 10.

By proxying TARP requests and responses, system 10 may be operable to create virtual segments in a Level-1 OSI routing area. As a result, system 10 facilitates the building of scalable and manageable OSI networks. For example, system 10 allows a network operator to scale OSI networks without upfront planning regarding OSI routing areas. A network operator may assign all network elements within system 10 to a single Level-1 routing area, which may obviate the need for an experienced network designer to pre-plan hierarchical OSI routing areas. In addition, by proxying TARP address resolution, a network operator may add additional network elements to the OSI Level-1 routing area without exceeding inherent size limitations. In addition, system 10 allows a network operator to scale OSI networks without upfront planning with respect to address scope. A network operator may assign addresses to particular network elements within system 10 as needed, without requiring an experienced network designed to pre-plan the entire address space of a network.

Additionally, by proxying TARP requests and responses, system 10 allows a network operator to reassign addresses within a given virtual segment of system 10 without impacting other virtual segments of system 10. As addresses are reassigned or changed, TARG 50 learns the new addresses through its role as TARP proxy agent and stores new TID-NSAP associations in memory. As a result, elements of system 10 do not all have to be reconfigured. Moreover, by providing a TL1 mediation process between elements of system 10 in different virtual segments, system 10 allows for convenient management of network elements without sacrificing the convenience of a single management device. Additionally, system 10 provides numerous cost-efficient benefits. Because NMS 30 and NEs 40 in system 10 may be unaware of the presence and operation of TARG 50, system 10 may be implemented with little or no reconfiguration of existing elements. Thus, system 10 is backward compatible with legacy and third party elements. Additionally, the functionality provided by TARG 50 may be included in software operating on a pre-existing network element. Thus, system 10 may allow for network expansion without the purchase of additional hardware. Specific embodiments, however, may provide none, some, or all of these benefits.

Figure 2:
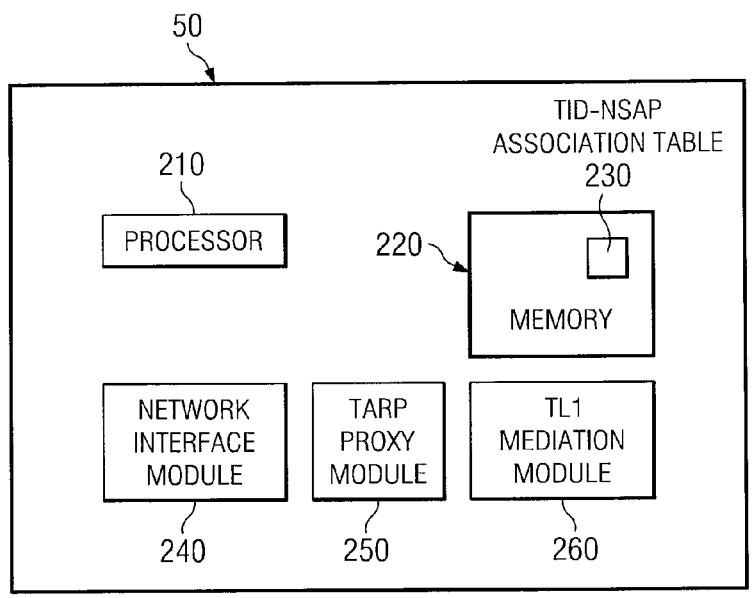
FIG. 2 is a block diagram illustrating in more detail a particular embodiment of a gateway that may be utilized in the proxy TARP address resolution system of FIG. 1A and FIG. 1B.

FIG. 2 is a block diagram illustrating in greater detail the contents and operation of a particular embodiment of TARG 50 shown in FIGS. 1A and 1B. In general, as discussed above with respect to FIG. 1, TARG 50 proxies TARP requests and responses and provides for TL1 mediation between various elements of system 10. As shown in FIG. 2, TARG 50 may include a processor 210, memory 220, TID-NSAP association table 230, a network interface module 240, a TARP proxy module 250, and TL1 mediation module 260.

Processor 210 may represent or include any form of processing component, including general purpose computers, dedicated microprocessors, or other processing components capable of processing electronic information. Examples of processor 210 include digital signal processors (DSPs), application-specific integrated circuits (ASICs), field-programmable gate arrays (FPGAs), and any other suitable specific or general purpose processors. Although FIG. 2 illustrates a particular embodiment of TARG 50 that includes a single processor 210, TARG 50 may, in general, include any suitable number of processors 210.

Memory 220 stores processor instructions, TID-NSAP association table 230, and/or other values and parameters that TARG 50 utilizes during operation. Memory 220 may comprise any collection and arrangement of volatile or non-volatile, components suitable for storing data, such as for example random access memory (RAM) devices, read only memory (ROM) devices, magnetic storage devices, optical storage devices, or any other suitable data storage devices. In particular embodiments, memory 220 may represent, in part, tangible computer-readable media on which computer instructions are encoded. In such embodiments, some or all the described functionality of TARG 50 may be provided by processor 210 executing the instructions encoded on the described media. Although shown in FIG. 2 as a single component, memory 220 may represent any number of memory elements within, local to, or accessible by TARG 50. Additionally, although shown in FIG. 2 as being located internal to TARG 50, memory 220 may represent storage components remote from TARG 50, such as elements at a Network Attached Storage (NAS), Storage Area Network (SAN), or any other type of remote storage component.

TID-NSAP association table 230 stores one or more associations between TIDs and NSAPs of various elements of system 10. As discussed with respect to FIG. 1 above, various elements of system 10 may be associated with a Target Identifier (TID) representing a user-assigned name for a particular node or element. Additionally, various elements may also be associated with a Network Service Access Point (NSAP) may represent a globally-unique user-assigned network address. In particular embodiments, upper-layer services and protocols utilize TIDs for communication with elements of system 10, while lower-layer services and protocols utilize NSAP addresses for communication. As TARG 50 proxies TARP requests and responses, it may store an NSAP address and TID for various elements of system 10. For subsequent TARP requests, TARG 50 may retrieve the associated NSAP entry from TID-NSAP association table 230 by referencing the TID included in the TARP request. Thus, if the NSAP address for a given TID is stored in TID-NSAP association table 230, TARG 50 may not transmit a TARP request on network 20 to resolve the NSAP. A particular NSAP entry for a given TID may be stored indefinitely in TID-NSAP association table 230, or may be removed after a predetermined or user-defined period of time.

Network interface module 240 couples TARG 50 to networks 20 and/or other appropriate components of system 10 to facilitate communication between TARG 50 and NMS 30, NE 40, including the exchange of TARP responses, TL1 mediation operations, and/or any other network communication. For example, TARG 50 may receive TARP request 60 from NMS 30 and transmit proxied TARP request 65 to NE 40 through network interface module 240. In particular embodiments, network interface module 240 includes or represents one or more network interface cards (NICs) suitable for packet-based or circuit-switched communication over networks 20. In particular embodiments, TARG 50 may include network interface module 240 for each connected network 20, or may include a single network interface module 240 that includes sub-interfaces for each connected network 20.

TARP proxy module 250 receives TARP request 60 and TARP response 70 from NMS 30 and NE 40, respectively, and transmits proxied TARP request 65 and proxied TARP response 75 to NMS 30 and NE 40, respectively, in accordance with the process described with respect to FIGS. 1A and 1B. Additionally, TARP proxy module 250 may store an NSAP address included in TARP response 70 in TID-NSAP association table 230. A particular NSAP entry may be stored indefinitely. In particular embodiments, TARP proxy module 250 may remove entries from the TID-NSAP association table 230 after a predetermined or user-defined time. As a result, entries in TID-NSAP association table 230 may be "aged-out" or removed after a period of time. In particular embodiments of system 10, TARP proxy module 250 may not store NSAP addresses included in TARP response 70, and may transmit a proxied TARP request 65 for each TARP request 60 received.

TL1 mediation module 260 receives TL1 messages 80 from NMS 30, and retrieves from TID-NSAP association table 230 an NSAP address corresponding to a TID included in a received TL1 message 80, in accordance with the process as described in FIG. 1B. Additionally, TL1 mediation module 260 transmits proxied TL1 message 90 to NE 40, which has an NSAP address of retrieved from TID-NSAP association table 230. TL1 mediation module 260 receives TL1 message 100 from NE 40, retrieves from TID-NSAP association table 230 an NSAP address corresponding to a TID included in TL1 message 100. TL1 mediation module 260 transmits proxied TL1 message 110 to NMS 30 having the NSAP address retrieved from TID-NSAP association table 230. TL1 mediation module 260 may perform the described functionality for multiple TL1 messages, thus creating two "stitched together" segments of a virtual TL1 connection between NMS 30 and one or more NEs 40. In general, however, TL1 mediation module 260 may perform the described functionality for any appropriate number or combination of elements of system 10.

In general, network interface module 240, TARP proxy module 250, and TL1 mediation module 260 may represent any appropriate combination of hardware and/or software suitable to provide the described functionality. Additionally, any two or more of network interface module 240, TARP proxy module 250, and TL1 mediation 260 may represent or include common components. In particular embodiments, network interface module 240, TARP proxy module 250, and TL1 mediation 260 may represent, in whole or in part, software applications being executed by processor 210.

Figure 3A:
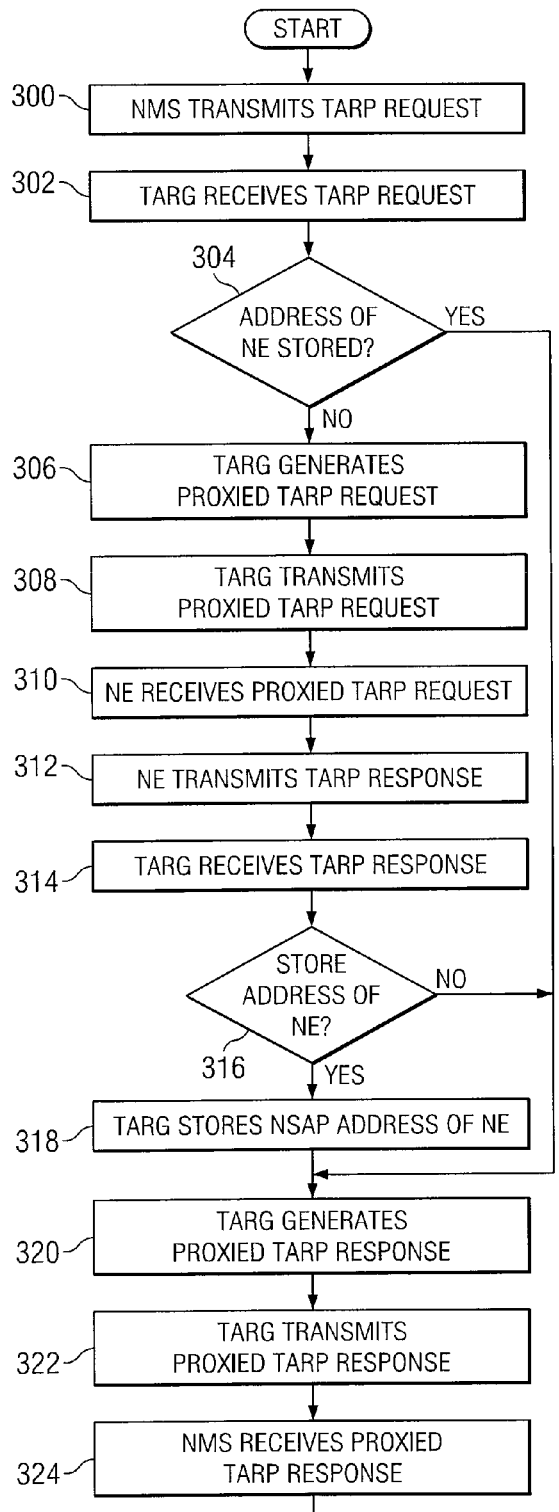
FIG. 3A is a flow chart illustrating an example operation of the proxy TARP address resolution system shown in FIG. 1A.

FIG. 3A is a flowchart illustrating example operation of a particular embodiment of system 10 in proxying TARP responses and requests between NMS 30 and NE 40. The steps illustrated in FIG. 3A may be combined, modified, or deleted where appropriate, and additional steps may also be added to those shown. Additionally, the steps may be performed in any suitable order without departing from the scope of the invention.

Operation, in the illustrated example, begins with NMS 30 initiating communication with an NE 40 (assumed to be NE 40c in this example) by requesting the NSAP address associated with the known TID. More specifically, in the described embodiment, NMS 30 transmits TARP request 60 on network 20a at step 300. In particular embodiments, NMS 30 may transmit TARP request 60 by broadcasting TARP request 60 on network 20. Additionally, NMS 30 may unicast or multicast TARP request 60 to TARG 50, or other node or element on network 20. In general however, NMS 30 may transmit TARP request 60 on network 20 in any appropriate manner suitable to perform the described functionality.

At step 302, TARG 50 receives TARP request 60, which requests an NSAP address for the TID of NE 40c. For example, in particular embodiments, TARP request 60 includes the requested TID in a predetermined field of TARP request 60. TARG 50 may receive TARP request 60 by monitoring network 20a on a particular port, by monitoring network 20a for broadcasts, by monitoring a particular multicast address, or by receiving TARP request 60 in a unicast data stream directly from NMS 30. At step 304, TARG 50 determines whether an entry for the NSAP address associated with the TID received in TARP request 60 is stored in TID-NSAP association table 230. If a corresponding entry is stored in TID-NSAP association table 230, operation proceeds with step 320. Otherwise, operation proceeds with step 306.

At step 306 TARG 50 generates proxied TARP request 65 based on TARP request 60. As noted above, proxied TARP request 65 may include any suitable information from TARP request 60 and/or other information stored or generated by TARG 50. In particular embodiments, TARG 50 generates proxied TARP request 65 by overwriting appropriate fields of TARP request 60 so that proxied TARP request 65 includes the NSAP address of TARG 50 as its source address.

At step 308, TARG 50 transmits proxied TARP request 65 on one or more networks 20. At step 310, NE 40 receives proxied TARP request 65. At step 312, NE 40c determines that its own TID is included in proxied TARP request 65 and transmits TARP response 70 to TARG 50. TARP response 70 may include the NSAP address of NE 40c. TARG 50 receives TARP response from NE 40c at step 314, and in step 316 determines whether to store the NSAP address of NE 40c contained in TARP response 70 in TID-NSAP association table 230. In particular embodiments, a determination may be made dynamically in accordance with a size limit or other parameter placed on TID-NSAP association table 230, or may be made statically based on a user-defined configuration. If the determination is made to store NSAP address of NE 40c in TID-NSAP association table 230, TARG 50 stores the NSAP address of NE 40c in TID-NSAP association table 230 at step 318. If not, operation proceeds with step 320.

At step 320 TARG 50 generates proxied TARP response 75 based on TARP response 70. As noted above, proxied TARP response 75 may include any suitable information from TARP response 70 and/or other information stored or generated by TARG 50. In particular embodiments, TARG 50 generates proxied TARP response 75 by overwriting appropriate fields of TARP response 70 so that proxied TARP response 75 includes the NSAP address of TARG 50 as its source address. By transmitting its own NSAP address to NMS 30, TARG 50 may cause NMS 30 to subsequently transmit data packets to TARG 50 when it attempts to communicate with NE 40c. In this manner, TARG 50 operates as a proxy agent for communications between NMS 30 and NE 40.

At step 322, TARG 50 transmits proxied TARP response 75 to NMS 30. At step 324, NMS 30 receives proxied TARP response 75 corresponding to TARP request 60 transmitted in step 300. As a result, NMS 30 may communicate with NE 40c by transmitting data packets on network 20 with a TID of NE 40c and an NSAP address of TARG 50. In this manner, communication between NMS 30 and NE 40 may be achieved through TARG 50 operating as a proxy agent. In particular embodiments, NMS 30, may store the NSAP address received in proxied TARP response 75 in a table or cache of TID-NSAP associations. Thus, for subsequent communications, NMS 30 may retrieve an NSAP address for a given TID from a memory in NMS 30 and forgo the operation as described in steps 300-324. Additionally, NMS 30 may "age out" or remove particular entries from a table of TID-NSAP associations after a predetermined or user-defined time, or when the table of TID-NSAP associations reaches a certain size limitation or other user-defined constraint.

Figure 3B:
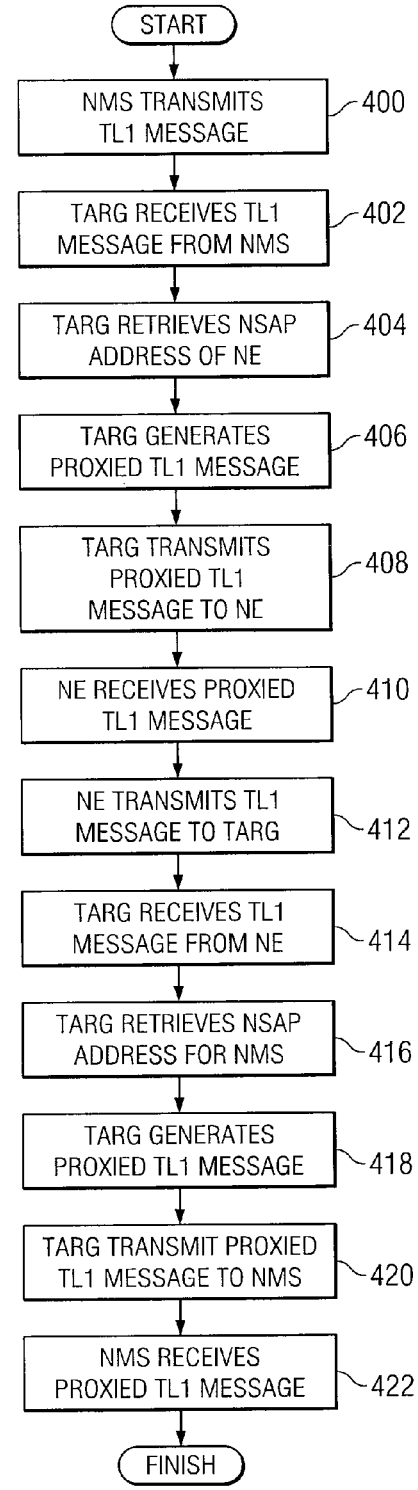
FIG. 3B is a flow chart illustrating an example operation of the TL1 mediation system shown in FIG. 1B.

FIG. 3B is a flowchart illustrating example operation of a particular embodiment of system 10 in which TARG 50 mediates TL1 messages between NMS 30 and an NE 40 (here, NE 40c). The steps illustrated in FIG. 3B may be combined, modified, or deleted where appropriate, and additional steps may also be added to those shown. Additionally, the steps may be performed in any suitable order without departing from the scope of the invention. As shown in FIG. 3A in steps 300-324, NMS 30 may resolve an NSAP address for a known TID of NE 40c in order to communicate with NE 40c. As a result, application protocols may be able to communicate with NE 40 through TARG 50. A particular example of NMS 30 utilizing TARG 50 as a TL1 mediator between NMS 30 and NE 40c is illustrated as follows.

Operation begins at step 400 in the following example with NMS 30 transmitting TL1 message 80 on network 20 with a TID of NE 40c and an NSAP address of TARG 50. As noted above, NMS 30 transmits TL1 message 80 to TARG 50, because the process as outlined in steps 300-324 results in NMS 30 associating a TID of NE 40c with an NSAP address of TARG 50. As noted above, NMS 30 may transmit TL1 message 80 to TARG 50 in any appropriate manner. At step 402, TARG 50 receives TL1 message 80 from NMS 30. TARG 50 recognizes that TL1 message includes a TID of NE 40c, and so retrieves the NSAP address of NE 40c from TID-NSAP association table 230 at step 404.

At step 406 TARG 50 generates proxied TL1 message 90 based on TL1 message 80 received from NMS 30. As noted above, proxied TL1 message 90 may include any suitable information from TL1 message 80 and/or other information stored or generated by TARG 50. In particular embodiments, TARG 50 generates proxied TL1 message 90 by overwriting appropriate fields of the TL1 message 80 received from NMS 30 so that proxied TL1 message 90 includes the NSAP address of TARG 50 as its source address and the NSAP address of NE 40c as its destination address.

At step 408, TARG 50 transmits proxied TL1 message 90 to NE 40c. At step 410, NE 40c receives proxied TL1 message 90. In particular embodiments, proxied TL1 message 90 may instruct NE 40c to perform certain operations or alter certain configurations of NE 40c or other elements of system 10. Additionally, proxied TL1 message 90 may cause NE 40c to transmit TL1 message 100 to NMS 30 through TARG 50 in response. For example, in the described embodiment, NE 40c transmits TL1 message 100 with a TID of NMS 30 and a destination NSAP address of TARG 50 at step 412. NE 40c transmits TL1 message 100 with the NSAP address of TARG 50 because TL1 message 100, from the perspective of NE 40c, was received from a device having a TID of NMS 30 but an NSAP address of TARG 50.

At step 414, TARG 50 receives TL1 message 100 from NE 40c, and in step 416 retrieves the NSAP address associated with the TID of NMS 30 (which is included in TL1 message 100) from TID-NSAP association table 230. In particular embodiments, an NSAP address associated with the TID of NMS 30 may not be present in TID-NSAP association table 230. In such cases, TARG 50 may transmit a TARP request and receive a TARP response from NMS 30 before transmitting responsive TL1 messages to NMS 30.

At step 418 TARG 50 generates proxied TL1 message 110 based on TL1 message 100 received from NE 40c. As noted above, proxied TL1 message 110 may include any suitable information from TL1 message 100 and/or other information stored or generated by TARG 50. In particular embodiments, TARG 50 generates proxied TL1 message 110 by overwriting appropriate fields of the TL1 message 100 received from NE 40c so that proxied TL1 message 110 includes the NSAP address of TARG 50 as its source address and the NSAP address of NMS 30 as its destination address.

At step 420, TARG 50 transmits proxied TL1 message 110 to NMS 30. At step 422, NMS 30 receives proxied TL1 message 110. Steps 400-422 may be optionally repeated, creating a bi-directional stream of multiple TL1 messages between NMS 30 and NE 40 through TARG 50. In this manner, TARG 50 operates as a TL1 mediator between NMS 30 and NE 40. It will be appreciated by one skilled in the art that, although TL1 is provided in the foregoing description as one example of an application protocol operating in system 10, any suitable protocol may utilize the various features, configuration, and benefits provided by system 10.

Although the present invention has been described with several embodiments, numerous changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of managing networks, comprising:
receiving at a gateway a first Target Identifier Address Resolution Protocol (TARP) request from a requesting node, wherein the first TARP request includes a Target Identifier (TID) of a destination node;
in response to receiving the first TARP request, generating a second TARP request based on the first TARP request, wherein the second TARP request includes the TID of the destination node and a Network Service Access Point (NSAP) address of the gateway;
transmitting the second TARP request from the gateway to the destination node;
receiving at the gateway a first TARP response from the destination node, wherein the first TARP response includes an NSAP address of the destination node;
in response to receiving the first TARP response, generating a second TARP response based on the first TARP response, wherein the second TARP response includes the TID of the destination node and the NSAP address of the gateway; and
transmitting the second TARP response to the requesting node.

2. The method of claim 1, further comprising:
receiving at the gateway a first Transaction Language 1 (TL1) message from the requesting node, wherein the first TL1 message includes the TID of the destination node and the NSAP address of the gateway;
in response to receiving the first TL1 message, generating a second TL1 message based on the first TL1 message, wherein the second TL1 message includes the NSAP address of the destination node; and
transmitting the second TL1 message from the gateway to the destination node.

3. The method of claim 2, further comprising:
receiving at the gateway a third TL1 message from the destination node, wherein the third TL1 message includes the TID of the requesting node and the NSAP address of the gateway;
in response to receiving the third TL1 message, generating a fourth TL1 message based on the third TL1 message, wherein the fourth TL1 message includes the NSAP address of the requesting node; and
transmitting the fourth TL1 message from the gateway to the requesting node.

4. The method of claim 1, further comprising:
after receiving the first TARP response from the destination node, storing the NSAP address of the destination node in an association table at the gateway;
storing the TID of the destination node in the association table; and
associating the stored NSAP address with the stored TID.

5. The method of claim 4, further comprising:
receiving a third TARP request from the requesting node, wherein the third TARP request includes a TID of a second destination node;
determining whether the TID of the second destination node is stored in the association table; and
in response to determining that the TID of the second destination node is not stored in the association table:
generating a fourth TARP request based on the third TARP request, wherein the fourth TARP request includes the TID of the second destination node and the NSAP address of the gateway; and
transmitting the fourth TARP request to the second destination node.

6. The method of claim 5, further comprising, in response to determining that the TID of the second destination node is stored in the association table:
generating a third TARP response, wherein the third TARP response includes an NSAP address associated with the TID of the second destination node; and
transmitting the third TARP response from the gateway to the requesting node.

7. A system for managing networks, comprising:
a requesting node, operable to:
transmit Target Identifier Address Resolution Protocol (TARP) requests to a gateway, wherein the TARP requests include Target Identifiers (TIDs) of remote nodes; and
transmit Transaction Language 1 (TL1) messages to the gateway wherein the TL1 messages include TIDs of remote nodes;
the gateway, operable to:
receive a first TARP request from the requesting node;
in response to receiving the first TARP request, generate a second TARP request based on the first TARP request, wherein the second TARP request includes a TID of a destination node and an NSAP address of the gateway;
transmit the second TARP request to the destination node;
receive a first TARP response from the destination node, wherein the first TARP response includes a Network Service Access Point (NSAP) address of the destination node;
in response to receiving the first TARP response, generate a second TARP response based on the first TARP response, wherein the second TARP response includes the TID of the destination node and the NSAP address of the gateway; and
transmit the second TARP response to the requesting node; and
the destination node operable to:
receive TARP requests from the gateway; and
in response to receiving TARP requests that include the TID of the destination node, transmit TARP responses to the gateway that include the NSAP address of the destination node.

8. The system of claim 7, wherein the gateway is further operable to:
receive a first Transaction Language 1 (TL1) message from the requesting node, wherein the first TL1 message includes the TID of the destination node and the NSAP address of the gateway;
in response to receiving the first TL1 message, generate a second TL1 message based on the first TL1 message, wherein the second TL1 message includes the NSAP address of the destination node; and
transmit the second TL1 message to the destination node.

9. The system of claim 8, wherein the gateway is further operable to:
receive a third TL1 message from the destination node, wherein the third TL1 message includes the TID of the requesting node and the NSAP address of the gateway;
in response to receiving the third TL1 message, generate a fourth TL1 message based on the third TL1 message, wherein the fourth TL1 message includes the NSAP address of the requesting node; and
transmit the fourth TL1 message to the requesting node.

10. The system of claim 7, wherein the gateway is further operable to:

after receiving the first TARP response from the destination node, store the NSAP address of the destination node in an association table at the gateway;

store the TID of the destination node in the association table; and associate the stored NSAP address with the stored TID.

11. The system of claim 10, wherein the gateway is further operable to:

receive a third TARP request from the requesting node, wherein the third TARP request includes a TID of a second destination node;

determine whether the TID of the second destination node is stored in the association table; and in response to determining that the TID of the second destination node is not stored in the association table:

generate a fourth TARP request based on the third TARP request, wherein the fourth TARP request includes the TID of the second destination node and the NSAP address of the gateway; and transmit the fourth TARP request to the second destination node.

12. The system of claim 11, wherein, in response to determining that the TID of the second destination node is stored in the association table, the gateway is operable to:

generate a third TARP response, wherein the third TARP response includes an NSAP address associated with the TID of the second destination node; and transmit the third TARP response to the requesting node.

13. A computer software product, comprising instructions encoded in non-transitory tangible media and operable, when executed, to:

receive at a gateway a first Target Identifier Address Resolution Protocol (TARP) request from a requesting node, wherein the first TARP request includes a Target Identifier (TID) of a destination node;

in response to receiving the first TARP request, generate a second TARP request based on the first TARP request, wherein the second TARP request includes the TID of the destination node and a Network Service Access Point (NSAP) address of the gateway;

transmit the second TARP request from the gateway to the destination node;

receive at the gateway a first TARP response from the destination node, wherein the first TARP response includes an NSAP address of the destination node;

in response to receiving the first TARP response, generate a second TARP response based on the first TARP response, wherein the second TARP response includes the TID of the destination node and the NSAP address of the gateway; and transmit the second TARP response to the requesting node.

14. The computer software product of claim 13, wherein the instructions are further operable to:

receive at the gateway a first Transaction Language 1 (TL1) message from the requesting node, wherein the first TL1 message includes the TID of the destination node and the NSAP address of the gateway;

in response to receiving the first TL1 message, generate a second TL1 message based on the first TL1 message, wherein the second TL1 message includes the NSAP address of the destination node; and transmit the second TL1 message from the gateway to the destination node.

15. The computer software product of claim 14, wherein the instructions are further operable to:

receive at the gateway a third TL1 message from the destination node, wherein the third TL1 message includes the TID of the requesting node and the NSAP address of the gateway;

in response to receiving the third TL1 message, generate a fourth TL1 message based on the third TL1 message, wherein the fourth TL1 message includes the NSAP address of the requesting node; and transmit the fourth TL1 message from the gateway to the requesting node.

16. The computer software product of claim 13, wherein the instructions are further operable to:

after receiving the first TARP response from the destination node, store the NSAP address of the destination node in an association table at the gateway;

store the TID of the destination node in the association table; and associate the stored NSAP address with the stored TID.

17. The computer software product of claim 16, wherein the instructions are further operable to:

receive a third TARP request from the requesting node, wherein the third TARP request includes a TID of a second destination node;

determine whether the TID of the second destination node is stored in the association table; and in response to determining that the TID of the second destination node is not stored in the association table:

generate a fourth TARP request based on the third TARP request, wherein the fourth TARP request includes the TID of the second destination node and the NSAP address of the gateway; and transmit the fourth TARP request to the second destination node.

18. The computer software product of claim 17, wherein the instructions are further operable to, in response to determining that the TID of the second destination node is stored in the association table:

generate a third TARP response, wherein the third TARP response includes an NSAP address associated with the TID of the second destination node; and transmit the third TARP response from the gateway to the requesting node.

19. A system for managing networks, comprising:

means for receiving at a gateway a first Target Identifier Address Resolution Protocol (TARP) request from a requesting node, wherein the first TARP request includes a Target Identifier (TID) of a destination node;

means for generating a second TARP request based on the first TARP request in response to receiving the first TARP request at the gateway, wherein the second TARP request includes the TID of the destination node and an NSAP address of the gateway;

means for transmitting the second TARP request from the gateway to the destination node;

means for receiving at the gateway a first TARP response from the destination node, wherein the first TARP response includes a Network Service Access Point (NSAP) address of the destination node;

means for generating a second TARP response based on the first TARP response in response to receiving the first TARP response at the gateway, wherein the second TARP response includes the TID of the destination node and the NSAP address of the gateway; and means for transmitting the second TARP response to the requesting node.

* * * * *